(12) United States Patent
Lang et al.

(10) Patent No.: US 8,548,717 B2
(45) Date of Patent: Oct. 1, 2013

(54) METHOD FOR PERFORMING AN INTAKE MANIFOLD INJECTION

(75) Inventors: Axel Lang, Marbach (DE); Wolfgang Samenfink, Besigheim (DE); Sebastien Kieffer, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 545 days.

(21) Appl. No.: 12/820,751

(22) Filed: Jun. 22, 2010

(65) Prior Publication Data

US 2011/0041806 A1 Feb. 24, 2011

(30) Foreign Application Priority Data

Aug. 21, 2009 (DE) .......................... 10 2009 028 798

(51) Int. Cl.
*F02D 41/34* (2006.01)
(52) U.S. Cl.
USPC ............ 701/105; 123/472; 123/478; 123/490
(58) Field of Classification Search
USPC ................. 123/448, 503, 500, 358, 359, 239, 123/251, 137, 472, 478, 490; 701/105
See application file for complete search history.

(56) References Cited

U.S. PATENT DOCUMENTS

| | | | | |
|---|---|---|---|---|
| 4,485,791 A * | 12/1984 | Sugo et al. | ..................... | 123/478 |
| 4,658,792 A * | 4/1987 | Yamashita et al. | ............ | 123/478 |
| 4,785,786 A * | 11/1988 | Nagao et al. | ................... | 123/488 |
| 5,027,778 A * | 7/1991 | Nogi et al. | ...................... | 123/472 |
| 5,042,718 A * | 8/1991 | Bergmann et al. | .............. | 239/88 |
| 5,150,691 A * | 9/1992 | Imajo | ............................ | 123/531 |
| 5,211,549 A * | 5/1993 | Kraemer | ....................... | 417/499 |
| 5,427,069 A * | 6/1995 | Tomisawa et al. | ............ | 123/478 |
| 6,062,201 A * | 5/2000 | Nozawa et al. | ............... | 123/478 |
| 6,196,204 B1* | 3/2001 | Janach | .......................... | 123/527 |
| 6,390,056 B1* | 5/2002 | Hertzberg et al. | ............ | 123/295 |
| 6,619,242 B2* | 9/2003 | Kaneko | .......................... | 123/21 |
| 6,739,295 B1* | 5/2004 | Yamaoka et al. | .......... | 123/90.15 |
| 7,426,908 B2* | 9/2008 | Brehob | ....................... | 123/25 C |
| 7,621,256 B2* | 11/2009 | Cunningham et al. | ........ | 123/305 |
| 7,715,974 B2* | 5/2010 | Gibson et al. | .................. | 701/103 |
| 7,983,832 B2* | 7/2011 | Sukegawa et al. | ............ | 701/105 |
| 2008/0208438 A1* | 8/2008 | Sukegawa et al. | ............ | 701/105 |
| 2013/0024093 A1* | 1/2013 | Murai | ........................... | 701/104 |

FOREIGN PATENT DOCUMENTS

| | | |
|---|---|---|
| JP | 2005/083285 | 3/2005 |
| JP | 2005/180285 | 7/2005 |

\* cited by examiner

*Primary Examiner* — Erick Solis
(74) *Attorney, Agent, or Firm* — Kenyon & Kenyon LLP

(57) ABSTRACT

A method for performing an intake manifold injection for at least one combustion chamber of an internal combustion engine, at least one intake valve being connected to an intake port, at least one exhaust valve and at least one injector being assigned to at least one combustion chamber, fuel being injected into the at least one intake port by the at least one injector during an injection time, the injection time being started after the closing of the at least one exhaust valve and terminated before the closing of the at least one intake valve for performing the method.

7 Claims, 2 Drawing Sheets

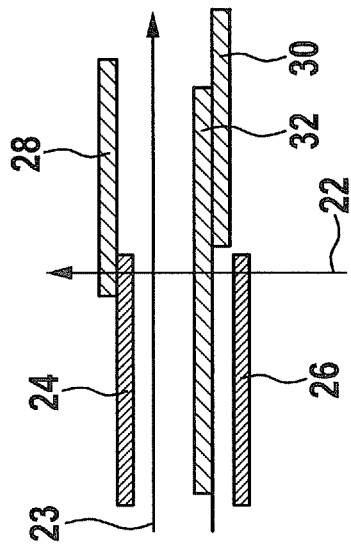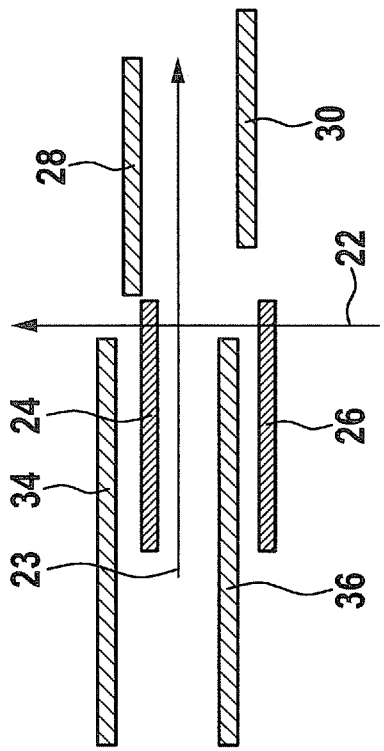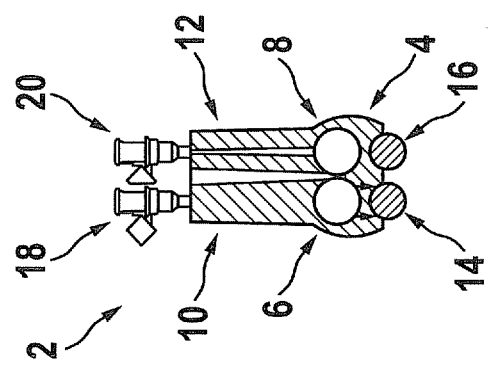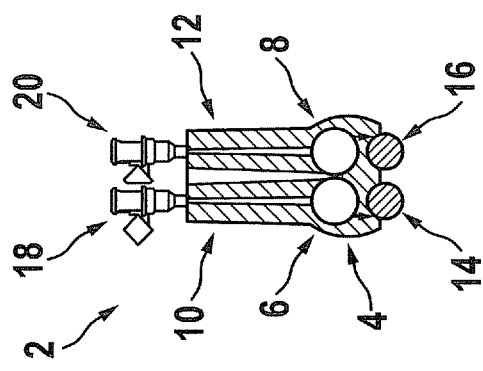
Fig. 1
Fig. 2

METHOD FOR PERFORMING AN INTAKE MANIFOLD INJECTION

FIELD OF THE INVENTION

The present invention relates to a method and an arrangement for performing an intake manifold injection.

BACKGROUND INFORMATION

So-called downsizing is used to reduce fuel consumption of a four-stroke gasoline engine, i.e., reducing displacement while maintaining the same performance data, typically the torque and/or the power. In order not to affect the power, either the maximum rotational speed or the relative air charge of the cylinders is increased with the aid of a crankshaft-driven compressor or an exhaust gas turbocharger.

In the latter case, torque shortcomings are known to occur in the lower rotational speed range. A compromise is usually necessary to adapt a turbo machine to the engine because the torque in the lower rotational speed range differs from that of a naturally aspirated engine of a comparable power class. When an air flow rate during operation has reached a certain level, which depends on the design of the turbo machine, enough charging pressure is built up to raise the torque to the level of the naturally aspirated engine.

This torque shortcoming was to be counteracted while still meeting the other target values, such as low emissions and engine smoothness. Development and research work so far have shown that an inexpensive approach to the aforementioned torque shortcoming is achievable by so-called scavenging.

In the scavenging method, which is a purging method, it is provided that, depending on the number of cylinders and the design of the intake manifold, the inlet system and the valve gear, there is a time interval within the crankshaft angle of 720° of the combustion cycle during which the exhaust gas backpressure is lower than the intake manifold pressure. If the intake valves and exhaust valves are opened simultaneously during this time interval, which is referred to as valve overlap, there is a flow of fresh air through the combustion chamber of the cylinder. This flow purges the remaining exhaust gases out of the combustion chamber, thereby increasing the air charge. The intended increase in torque is one result of this measure. This also significantly improves the dynamics of the internal combustion engine.

One disadvantage of the scavenging effect is that some of the fresh air flowing in through the intake valve goes directly to the exhaust gas system without having been involved in the combustion. This has consequences for exhaust gas purification, e.g., using a three-way catalytic converter, so that the resulting conversion is only partial. If, instead of fresh air, a stoichiometric mixture is available for through-flow, then a mixture of fresh air, vaporized fuel and exhaust gases from combustion is present in the exhaust gas system. This mixture of different gases is not completely converted by the catalytic converter. In the case of a stoichiometric conversion, there is also an exothermic reaction, which may severely damage the catalytic converter or at least greatly shorten its lifetime.

One approach to this challenge is to combine scavenging with so-called direct fuel injection. This technology allows an injection strategy, which prevents unburned fuel mixed with air from being conveyed into the exhaust gas system. However, use of the systems known from the related art in the aforementioned combination causes increased costs. Direct gasoline injection or BDE technology usually requires high-quality components for high-pressure injection, typically high-pressure pumps, high-pressure lines, pressure regulators, fuel injectors having narrow tolerances, etc.

An inexpensive alternative to BDE technology would be the use of traditional intake manifold injection (SRE), although in its present form it is unable to prevent transport of unburned hydrocarbons.

In the standard case, fuel is injected into the intake port in intake manifold injection technology (later referred to as SRE technology) to provide a displacement long before the opening of the intake valve, so that a wall film is formed in the intake port. This wall film is torn away the next time the intake valve opens. This achieves, among other things, a homogenization of the fuel-air mixture, resulting in favorable properties. Emissions are diminished and the catalytic converter's burden is reduced. This makes it possible to meet prescribed exhaust gas standards.

Due to the simultaneous use of upstream injection and the scavenging effect, with the SRE technology there is the risk that a mixture of exhaust gases, fresh air and unburned vaporized hydrocarbons might enter the exhaust gas system directly, resulting in increased emissions.

Various approaches to solving these SRE-specific problems have been published so far and are mentioned here as examples.

Japanese Patent No. JP 2005/083285 relates to a turbocharged gasoline engine and its valve control times. The valve system used here includes two intake valves and two exhaust valves, each having its own intake port, for each cylinder of the engine. These intake valves are opened with a time offset per cylinder, for example, with the aid of a variable offset between the intake cams. This time offset is determined by the design and is consequently not variable. Intake and exhaust valve overlap is required to be able to employ the scavenging effect. Japanese Patent No. JP 2005/083285 therefore describes a system, for example a so-called "variable valve control," which makes it possible to vary the opening times on the intake side during engine operation so that the overlap of the intake and exhaust valves is freely selectable. With the aid of a single injector, fuel is injected into the intake port, where there is also a first intake valve. This first intake valve opens later than a second intake valve, so that the first intake valve and the exhaust valves do not overlap. The scavenging effect is thus applied on the side of the second intake valve when open states of the second intake valve and of one exhaust valve overlap, and fuel is injected on the side of the first intake valve with upstream displacement without any risk that the fuel will then enter the exhaust gas system in unburned form. Thanks to this configuration, the aforementioned scavenging effect may also be used for the engine without causing increased hydrocarbon emissions.

Japanese Patent No. JP 2005/180285 describes a similar system relating to a control unit for a supercharged internal combustion engine using a turbocharger. Here again, an offset is provided between the cams for activation of the two intake valves, but an injector is assigned to each intake port, so that each cylinder has two injectors. Variable valve control is also used for adjusting a valve overlap on the intake side. If the scavenging effect is to be used, fuel is injected upstream only on the side without valve overlap.

SUMMARY OF THE INVENTION

By making use of the scavenging effect, the present invention should allow an increase in torque in a possible implementation for engines using intake manifold injection (SRE engines) and thus in engines using intake manifold injection or fuel injection in the intake manifold or intake port upstream from the intake valve. At the same time, the present invention should allow the unburned hydrocarbons to be minimized, thus preventing a heavy burden on the catalytic converter due to an extreme exothermic reaction.

Among other things, the present invention provides an injection strategy, in which the start of injection occurs after the closing of the exhaust, i.e., exhaust valve ("exhaust closes") and the termination of injection, i.e., termination of the injection time occurs before the closing of the intake, i.e., intake valve ("intake closes").

The present invention may be used in all gasoline engines regardless of their geometry or shape (for example, three-cylinder in-line, four-cylinder in-line, V6 cylinder, V8 cylinder) which may support the scavenging effect.

An adjustment in the fuel system or a corresponding fuel configuration is made in order to be able to inject the required amount of fuel in such a short period of time. Static mass flow $Q_{stat}$ of the injectors may be increased through design-engineering measures. The injection pressure may also be increased, thus achieving a much higher steady-state mass flow during the injection. To also be able to decrease even these small fuel quantities without getting into the nonlinear range of the injectors, the system pressure during operation should be variable from approximately 3 bar to approximately 9 bar. A system for regulating the fuel pressure (e.g., demand-controlled fuel supply) may be used for this.

It is usually possible to use any injection system or injection configuration, which makes it possible to shorten the injection time, in such a way that the injection strategy provided within the scope of the present invention may be implemented for execution of the method.

In order for the quantity of fuel injected during the injection time to be completely burned, a design of the intake port such that the fuel spray comes in contact with the smallest possible surface area of the intake port may be ensured through design-engineering measures, e.g., the positioning of the injector in the intake port. This prevents an upstream effect from coming about and prevents a portion of the injected fuel from reaching the combustion chamber unburned only in the next cycle and thus entering the exhaust gas system.

The configuration described here is designed for performing all the steps of the method presented here. Individual steps of this method may also be performed by individual components of the configuration. In addition, functions of the configuration or functions of individual components of the configuration may also be implemented as steps of the method. Furthermore, it is possible for steps of the method to be implemented as functions of individual components of the configuration or of the configuration as a whole.

BRIEF DESCRIPTION OF THE DRAWINGS

FIG. 1 shows a schematic representation of a detail of an SRE internal combustion engine, which is known and is said to employ the scavenging effect. The diagram at the side shows the injection strategy used when the scavenging effect is manifested.

FIG. 2 shows a schematic representation of the same internal combustion engine. The diagram at the side shows the injection strategy used when the scavenging effect is then no longer being utilized.

DETAILED DESCRIPTION

Figure 3:
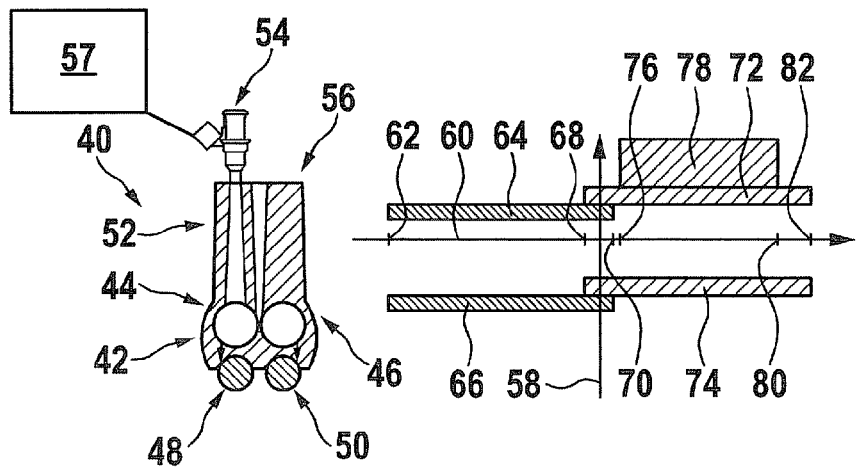
FIG. 3 shows a detail of a first specific embodiment of an internal combustion engine and a diagram of a first specific embodiment of an injection strategy, which is used in a first implementation of the method according to the present invention.

FIGS. 1 and 2 each show schematic representations of a detail of an internal combustion engine 2, which uses a known approach for employing the scavenging effect in SRE technology. The basis for the representation of this approach is to allow a comparison with the present invention described here.

Internal combustion engine 2 includes a combustion chamber 4, which is connected via a first intake valve 6 and a second intake valve 8 to an intake port 10, 12. Furthermore, combustion chamber 4 is connected to two exhaust valves 14, 16. An injector 18, 20 is associated with each intake port 10, 12. Intake valves 6, 8 are controlled via a camshaft on which offset cams are installed, operating both intake valves 6, 8 with a time offset during operation. The intake control times are variable with the aid of a valve control during operation.

The two diagrams in each of FIGS. 1 and 2 include a vertically oriented axis 22, along which states of components of internal combustion engine 2 are plotted against a horizontally oriented time axis 23.

The scavenging effect is manifested in the operating situation depicted in FIG. 1. The diagram in FIG. 1 shows an opening time 24 of first exhaust valve 14, an opening time 26 of second exhaust valve 16, an opening time 28 of first intake valve 6, an opening time 30 of second intake valve 8 and an injection time 32 of second injector 20.

During operation of internal combustion engine 2, exhaust valves 14, 16 are acted upon by the associated exhaust camshafts and are opened and closed simultaneously to provide opening times 24, 26. Intake valves 6, 8 are acted upon by intake cams, which operate with a time offset. In the present case, opening time 28 of first intake valve 6 is started and terminated before opening time 30 of second intake valve 8.

As also shown by the diagram in FIG. 1, a valve overlap occurs with first intake valve 6 and first exhaust valve 14, first intake valve 6 and first exhaust valve 14 being opened simultaneously. As already mentioned, in the situation described here, internal combustion engine 2 is operated in scavenging mode. Injection time 32 of second injector nozzle 20 extends over the opening times of all intake valves 6, 8 and all exhaust valves 14, 16.

A second operating situation of internal combustion engine 2 is described on the basis of FIG. 2. As shown by the diagram in FIG. 2, opening times 28, 30 of both intake valves 6, 8 are offset in time. However, the opening times of exhaust valves 24, 26, are synchronized. Furthermore, in contrast with the operating situation described on the basis of FIG. 1, there is no valve overlap of opening times 24, 26 of exhaust valves 14, 16 and opening times 28, 30 of intake valves 6, 8. The diagram in FIG. 2 additionally shows a first injection time 34 of first injector 18 and an injection time 36 of second injector 20. Injection times 34, 36 of injectors 18, 20 overlap here only with opening times 24, 26 of exhaust valves 14, 16. Internal combustion engine 2 thus does not use any scavenging effect in this operating situation.

FIGS. 1 and 2 show the changes needed in comparison with a traditional internal combustion engine to be able to employ the scavenging effect without causing excessive emissions. The additional figures show the invention described here, which is in competition with that.

FIG. 3 shows a schematic representation of a detail of a first internal combustion engine 40 having a combustion chamber 42 or cylinder, which may be opened and closed via a first intake valve 44 and a second intake valve 46 on one intake side. On one exhaust side, combustion chamber 42 may be opened and closed via a first exhaust valve 48 and a second exhaust valve 50. In addition, first intake valve 44 forms a transition to a first intake port 52, to which an injector 54 is assigned. A second intake port 56 is connected to combustion chamber 42 via second intake valve 46. In addition, FIG. 3 schematically shows a specific embodiment of a control unit 57.

Intake manifold injection is performed for combustion chamber 42 of internal combustion engine 40, shown here in greater detail. This means that air is supplied via intake ports 52, 56. Fuel is additionally injected by injector 54 into first intake port 52, so that a fuel-air mixture is formed in first intake port 52. This fuel-air mixture enters combustion chamber 42 and is burned there after the opening of first intake valve 44.

The diagram in FIG. 3 includes a vertically oriented axis 58 along which the operating states of the components of internal combustion engine 40 are plotted against a horizontally oriented time axis 60.

It is provided that both exhaust valves 48, 50 are opened at a first point in time 62 ($T_1$). During an opening time 64 of first exhaust valve 48 and an opening time 66 of second exhaust valve 50, first intake valve 44 and second intake valve 46 are opened at a second point in time 68 ($T_2$). Both exhaust valves 48, 50 are closed at a third point in time 70 ($T_3$). Opening times 72, 74 of intake valves 44, 46 are thus synchronized with regard to their onset. At a fourth point in time 76 ($T_4$), it is provided that injector 54 is opened so that injection time 78 of injector 54 begins at fourth point in time 76 ($T_4$). Injection time 78 of injector 54 is terminated at a fifth point in time 80 ($T_5$) at the termination of injection. Termination of opening times 72, 74 of intake valves 42, 46 is subsequently provided at a sixth point in time 82 ($T_6$).

Figure 4:
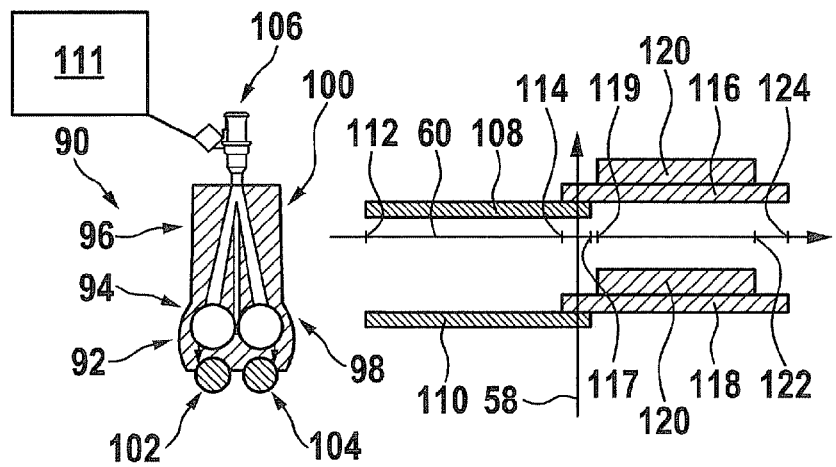
FIG. 4 shows a detail of a second specific embodiment of an internal combustion engine and a diagram of a second specific embodiment of an injection strategy, such as that used in a second specific embodiment of the method according to the present invention.

The detail of the second specific embodiment of an internal combustion engine 90 represented schematically in FIG. 4 shows a combustion chamber 92, which is connected to a first intake port 96 via a first intake valve 94 and to a second intake port 100 via a second intake valve 98. Furthermore, combustion chamber 92 is opened and closed by a first exhaust valve 102 and a second exhaust valve 104. An injector 106 of internal combustion engine 90 is positioned centrally between two intake ports 96, 100, so that fuel is injectable into both intake ports 96, 100 simultaneously via injector 106. In intake ports 96, 100, fuel injected through injector 106 is mixed with air, which is conveyed in the direction of combustion chamber 92 or cylinder within intake ports 96, 100. Thus, intake manifold injection is also implemented for the second specific embodiment of internal combustion engine 90. Furthermore, FIG. 4 illustrates another specific embodiment of a control unit 111 in a schematic representation.

Similarly to the diagram in FIG. 3, operating states of the components of internal combustion engine 90 are shown in their time sequence on a vertically oriented axis 58 over a horizontally oriented time axis 60 in the diagram in FIG. 4.

It is provided that opening times 108, 110 of both exhaust valves 102, 104 begin at a first point in time 112 ($T_1$). Opening times 116, 118 of intake valves 94, 98 are already started at a second point in time 114 ($T_2$). Opening times 108, 110 of exhaust valves 102, 104 are terminated at a third point in time 117 ($T_3$). An injection time 120 of injector 106 begins at a fourth point in time 119 ($T_4$). In the diagram in FIG. 4, this injection time 120 is shown twice for both intake ports 96, 110 because fuel is injected into both intake ports 96, 100 simultaneously by injector 106. Injection time 120 of injector 106 is terminated at a fifth point in time 122 ($T_5$). Opening times 116, 118 of intake valves 94, 98 are terminated at a sixth point in time 124 ($T_6$).

Figure 5:
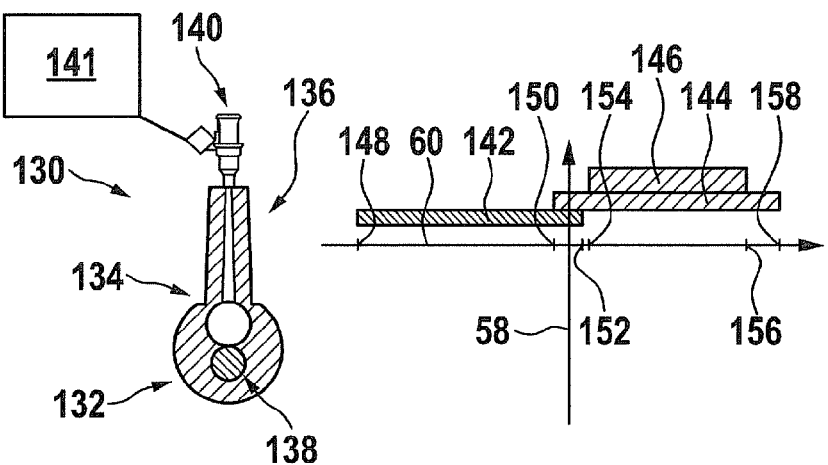
FIG. 5 shows a schematic representation of a detail of a third specific embodiment of an internal combustion engine and a diagram of a third specific embodiment of an injection strategy used in a third specific embodiment of the method according to the present invention.

The detail of a third specific embodiment of an internal combustion engine 130 represented schematically in FIG. 5 shows a combustion chamber 132, which is connected to an intake port 136 via an intake valve 134. Furthermore, combustion chamber 132 is opened and closed by an exhaust valve 138. Internal combustion engine 130 also includes an injector 140, which is assigned to intake port 136. A specific embodiment of control unit 141 is also shown here schematically.

Intake manifold injection is also implemented for the third specific embodiment of internal combustion engine 130, air being conveyed through intake port 136 and mixed with fuel injected by injector 140. A fuel-air mixture thereby formed is conveyed through intake valve 134 into combustion chamber 132 and burned there. The exhaust gas from combustion of this fuel-air mixture is removed from combustion chamber 132 via exhaust valve 138.

Similarly to the diagrams in FIGS. 3 and 4, the diagram in FIG. 5 includes a vertically oriented axis 58 and a horizontally oriented time axis 60.

The diagram in FIG. 5 shows an opening time 142 of exhaust valve 138, an opening time 144 of intake valve 134 and an injection time 146 of injector 140. The detail shows that opening time 142 of exhaust valve 138 begins at a first point in time 148 ($T_1$). An opening time 144 of intake valve 134 begins at a second point in time 150 ($T_2$). Opening time 142 of exhaust valve 138 is terminated at a third point in time 152 ($T_3$). Injection time 146 of injector 140 begins at a fourth point in time 154 ($T_4$), this injection time 146 being terminated at a fifth point in time 156 ($T_5$). Opening time 144 of injector 134 is terminated at a sixth point in time 158 ($T_6$).

As in the specific embodiments of the present invention described with reference to FIGS. 3 and 4, exhaust valve 138 and intake valve 134 are opened simultaneously between second point in time 150 and fourth point in time 154, thus yielding a valve overlap and therefore a scavenging effect.

All three specific embodiments illustrated in FIGS. 3, 4 and 5 have in common the fact that an injection time 78, 120, 146 of injector 54, 106, 140 begins after termination of an opening time 64, 66, 108, 110, 142 of at least one exhaust valve 48, 50, 102, 104, 138 and thus after the closing of at least one exhaust valve 48, 50, 102, 104, 138. Furthermore, it is provided that injection time 78, 120, 146 of injector 54, 106, 140 is terminated before termination of an opening time 72, 74, 116, 118, 144 of at least one intake valve 44, 46, 94, 98, 134.

In addition, it is provided in all specific embodiments that a valve overlap occurs between the at least one exhaust valve 48, 50, 102, 104, 138 and the at least one intake valve 44, 46, 94, 98, 134 between second point in time 68, 114, 150 ($T_2$) and third point in time 70, 117, 152 ($T_3$). Injection time 78, 120, 146 of injector 54, 106, 140 begins, i.e., starts only after the valve overlap at fourth point in time 76, 119, 154 ($T_4$). Fuel is thus injected through injector 54, 106, 140 only when the at least one exhaust valve 48, 50, 102, 104, 132, 138 is closed and the at least one intake valve 44, 46, 94, 98, 134 is opened.

The injection strategies described with reference to FIGS. 3, 4 and 5 are each controlled by a control unit 57, 111, 141. To do so, control unit 57, 111, 141 controls injection time 78, 120, 146 of injector 54, 106, 140 directly or indirectly, this injection time being limited in time by a start of injection and a termination of injection, opening times 64, 66, 72, 74, 108, 110, 116, 118, 142, 144 of the at least one exhaust valve 48, 50, 102, 104, 132, 138 and the at least one intake valve 44, 46, 94, 98, 134 being taken into account. To do so, control unit 57, 111, 141 may interact with devices such as camshafts, which are designed for acting upon the aforementioned valves, and consequently also control their opening times 64, 66, 72, 74, 108, 110, 116, 118.

What is claimed is:

1. A method for performing an intake manifold injection for at least one combustion chamber of an internal combustion engine, at least one intake valve, which is connected to at least one intake port, at least one exhaust valve and at least one injector being assigned to each combustion chamber, the method comprising:
    injecting fuel into the at least one intake port during an injection time by the at least one injector;
    starting the injection time only after a closing of the at least one exhaust valve and only after opening of the at least one intake valve; and
    terminating the injection time before a closing of the at least one intake valve;
    wherein a valve overlap is provided for the at least one intake valve and the at least one exhaust valve, the at least one intake valve and the at least one exhaust valve being opened simultaneously during the valve overlap.

2. The method according to claim 1, wherein the injection time is started at the earliest after termination of the valve overlap.

3. The method according to claim 1, wherein the method is performed at an increased steady-state mass flow of the at least one injector, a value of the steady-state mass flow being 50% to 70%.

4. The method according to claim 1, further comprising:
    varying a pressure of a fuel injection system between about 3 bar to about 9 bar to provide a sufficient amount of fuel during the injection time for generating a required torque.

5. The method according to claim 1, wherein the valve overlap is variable.

6. A system for performing an intake manifold injection for at least one combustion chamber of an internal combustion engine, at least one intake valve, which is connected to at least one intake port, at least one exhaust valve and at least one injector being assigned to each combustion chamber, during an injection time fuel being injected by the at least one injector into the at least one intake port, the system comprising:
    at least one control unit for controlling a function of the at least one injector, the at least one control unit being designed to:
        start the injection time only after a closing of the at least one exhaust valve and only after opening of the at least one intake valve; and
        terminate the injection time before a closing of the at least one intake valve;
    wherein a valve overlap is provided for the at least one intake valve and the at least one exhaust valve, the at least one intake valve and the at least one exhaust valve being opened simultaneously during the valve overlap.

7. The method according to claim 1, wherein the valve overlap is variable, the method further comprising:
    varying at least one of a fuel injection pressure and a fuel injection system pressure to provide a sufficient amount of fuel during the injection time for generating a required torque.

* * * * *